United States Patent Office 3,414,412
Patented Dec. 3, 1968

3,414,412
PRODUCING A MANDARIN-LIKE FLAVORING COMPOSITION BY ADMIXING THYMOL AND METHYL-N-METHYL ANTHRANILATE
Erwin Kovats, Ruschlikon, Zurich, Switzerland, assignor to Firmenich et Cie., Geneva, Switzerland
No Drawing. Filed Mar. 24, 1964, Ser. No. 354,428
Claims priority, application Switzerland, Mar. 29, 1963, 4,007/63
8 Claims. (Cl. 99—140)

The present invention relates to flavoring compositions which are capable of imparting a mandarin or tangerine-like flavor and aroma to foodstuffs and beverages.

The oils obtained by pressing the peel of mandarins or tangerines are used to some extent, either as such or after partial or complete deterpenation, for flavoring beverages and foodstuffs. However, this use is limited by the fact that the cost of mandarin or tangerine oils is substantially higher as compared with that of the other citrus oils such as orange, lemon, lime and grapefruit oils. Furthermore, the flavor and aroma qualities of mandarin or tangerine oils available on the market are highly influenced by the soil, climatic and cultural conditions prevailing in the different areas where these citrus fruits are grown. Thus, the manufacturer using natural mandarin or tangerine oils for flavoring beverages or foodstuffs cannot rely on uniform flavor and aroma qualities in oils of various origins or in oil lots of the same origin but purchased at different times. On the other hand, there exists in the beverage and foodstuff industries an increasing demand for reasonably priced mandarin or tangerine flavors having uniform flavor and aroma qualities.

An object of this invention is to provide flavoring compositions prepared from synthetic flavoring ingredients and capable of imparting a mandarin or tangerine-like flavor and aroma to foodstuffs and beverages.

Another object of this invention is to provide synthetic or at least partially synthetic mandarin or tangerine flavors which have uniformly reproducible flavor and aroma qualities and which can be used as substantially less expensive substitutes for the natural mandarin or tangerine oils.

In this specification and in the appended claims the term "mandarin" will be used generically for the fruits of *Citrus reticulata* Blanco var. "Mandarin" (yellow fruited varieties) as well as the fruits of *Citrus reticulata* Blanco var. "Tangerine" (deep orange or scarlet fruited varieties) (cf. "The Essential Oils" by E. G. Guenther, volume 3, p. 334, D. Van Nostrand Company, 1949).

I made the surprising discovery that a mandarin-like flavor and aroma was imparted to certain beverages or foodstuffs when a combination consisting of a lower alkyl anthranilate, e.g. methyl N-methyl-anthranilate, and thymol (2-isopropyl-5-methyl-phenol) was incorporated in said beverages or foodstuffs. This effect was quite unexpected in view of the fact that neither the anthranilates nor thymol, when tested individually, have an odor and a flavor reminiscent of the mandarin flavor and aroma. Thymol has a definitely revolting chemical odor and taste which can be defined as phenolic, cresolic or naphtholic and metallic. The anthranilates, in particular methyl N-methyl-anthranilate, have a disagreeable burnt rubber-like odor and taste. It is only the combination of both ingredients, i.e. of anthranilate and thymol, which develops a typically mandarin-like flavor and aroma. The mechanism of this flavor-developing phenomenon which takes place between the anthranilate and thymol is not known. It may be that thymol, which is a weak acid, and the anthranilate, which is a weak base, partially combine in the solvent or diluent in which they will normally be used or in the presence of the humidity or water contained in the foodstuffs or beverages in which they are incorporated. This combination may give rise to the formation of a labile complex, e.g. of the pseudo salt type, which would be responsible for the flavor-producing effect.

The flavoring composition of this invention comprises in combination thymol and methyl N-methyl-anthranilate. The ratio by weight between thymol and the anthranilate can be varied within a relatively wide range, e.g. between about 1 to 5 and about 1 to 50. These figures are illustrative only and should not be construed as absolute limits. The appropriate weight ratio between thymol and the anthranilate will depend on the particular type of foodstuff or beverage to be flavored and on the specific flavor note desired. In many cases good flavor effects are obtained with compositions comprising 1 part by weight of thymol per 10 parts by weight of anthranilate. Part of the methyl N-methyl-anthranilate in the flavoring composition may be replaced by other anthranilates, e.g. compounds of the formula

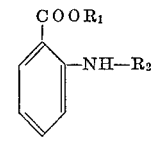

wherein $R_1$ represents a straight chain or branched lower alkyl radical having from 1 to 5 carbon atoms and $R_2$ represents hydrogen or methyl. Examples of compounds covered by the above formula are: methyl, ethyl, propyl, isopropyl, butyl, isobutyl and amyl anthranilates, and ethyl, propyl, isopropyl, butyl and isobutyl N-methyl-anthranilates. By replacing part of the methyl N-methyl-anthranilate in the flavoring composition it is possible to develop slight variations of the mandarin-like flavor.

The flavoring composition can furthermore comprise a diluent or solvent for the combination of thymol and methyl N-methyl-anthranilate in order to facilitate the incorporation of the flavor in the materials to be flavored. The usual diluents or solvents known to those skilled in the art of flavors can be used for this purpose. As a suitable solvent, alcohol, e.g. 95% aqueous alcohol, may be used. A further example of an appropriate diluent is limonene which is the main constituent of the terpene fractions of citrus oils. It is advantageous to use, instead of limonene, the limonene-containing terpene fractions as a whole, the said terpene fractions being commercially available as cheap by-products from the deterpenation of orange, lemon or grapefruit oils. The deterpenation of orange, lemon and grapefruit oils is commonly carried out on a large commercial scale either by distillation or by extraction procedures in order to obtain terpeneless oils. Orange terpenes obtained in this manner are well suited as a diluent for the flavoring composition of this invention. The addition of the said terpenes results in a flavoring composition which develops a flavor and aroma having an even more natural note.

The flavoring composition of this invention may also include further flavor ingredients known in the art to improve or enhance the fruity aroma of imitation citrus flavors. Thus, aliphatic alcohols such as heptanol, octanol, decanol, etc., terpene alcohols such as α-terpineol, aldehydes such as octanal, decanal, undecanal, dodecanal, etc., may be admixed to thymol and methyl N-methyl-anthranilate in order to obtain a more balanced mandarin-like flavor.

For the purpose of flavoring foodstuffs and beverages the flavoring composition of this invention is conveniently used in such amounts that 100 kg. of the finished food or beverage contain about 0.1 to 3 g. of thymol and anthranilate taken together.

The flavoring composition of this invention is useful for flavoring beverages, e.g. syrups and carbonated beverages, as well as foodstuffs such as ice cream, confectionery, hard or soft candies, gelatin desserts, icings, creams used as fillings, yogurt, etc.

In practising the invention the flavoring composition can be prepared according to the following illustrative formulae (parts being parts by weight): 35 parts of methyl N-methyl-anthranilate, 1 part of thymol and 964 parts of 95% alcohol; 30 parts of methyl N-methyl-anthranilate, 3 parts of thymol and 967 parts of orange terpenes; 30 parts of methyl N-methyl-anthranilate, 1 part of thymol and 969 parts of orange terpenes; 35 parts of methyl N-methyl-anthranilate, 2 parts of thymol, 3 parts of citral, 0.2 part of decanal, 0.3 part of dodecanal and 959.5 parts of orange terpenes; 35 g. of methyl N-methyl-anthranilate, 15 parts of isobutyl N-methyl-anthranilate, 2 parts of thymol and 948 parts of 95% alcohol. These compositions can be used in quantities of 5 to 40 g. per 100 kg. of material to be flavored.

A flavoring composition formulated according to this invention was tested against the corresponding composition containing no thymol, as follows:

A watery ice cream base was prepared in the usual manner from a sugar syrup of 18° Baumé containing 1 g. of citric acid per 100 g. of syrup. The ice cream base was divided into two portions which were separately flavored by incorporating flavors I and II, respectively, in the proportion of 0.1 g. of flavor per 1 kg. of ice cream base. Flavors I and II were prepared according to the following formulae:

| Ingredients | Parts by weight | |
| --- | --- | --- |
| | I | II |
| Methyl N-methyl-anthranilate | 30 | 30 |
| Thymol (10% in alcohol) | 10 | |
| Dodecanal | 0.3 | 0.3 |
| Citral | 0.2 | 0.2 |
| α-Terpineol | 10 | 10 |
| Octanol | 2 | 2 |
| Orange terpenes | 947.5 | 957.5 |
| | 1,000 | 1,000 |

After freezing the two ice portions were tested organoleptically. The ice portion flavored with flavoring composition I had a strong typically mandarin-like flavor, whereas the ice portion flavored with flavoring composition II had an unspecific fruity aroma lacking the typical mandarin note.

I am aware of the fact that methyl N-methyl-anthranilate has been used in imitation mandarin flavors prior to my invention. The essence of my invention is the use of a combination of thymol with methyl N-methyl-anthranilate in the preparation of artificial mandarin flavors.

I claim:
1. The method of producing a synthetic flavoring composition which comprises forming an admixture consisting essentially of methyl N-methyl-anthranilate and thymol in a relative proportion so as to impart a mandarin-like flavor and aroma to foodstuffs and beverages.
2. The method of producing a synthetic flavoring composition which comprises forming an admixture consisting essentially of flavor ingredients thymol and methyl N-methyl-anthranilate in a ratio by weight between about 1 to 5 and about 1 to 50.
3. The method of producing a flavoring composition which comprises forming an admixture consisting essentially of synthetic flavoring ingredients thymol and methyl N-methyl-anthranilate in a ratio by weight of about 1 to 10.
4. The method of producing a flavoring composition which comprises forming an admixture consisting essentially of synthetic flavor ingredients thymol and methyl N-methyl-anthranilate and at least one further anthranilate other than methyl N-methyl-anthranilate, said further anthranilate corresponding to the formula

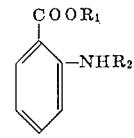

wherein $R_1$ is selected from the group consisting of a straight chain alkyl radical having from 1 to 5 carbon atoms and a branched alkyl radical having from 1 to 5 carbon atoms, the ratio by weight between thymol and the total anthranilates being from about 1 to 5 to about 1 to 50.
5. The method of producing a flavoring composition which comprises forming an admixture consisting essentially of synthetic flavor ingredients thymal and methyl N-methyl-anthranilate along with a diluent, said diluent consisting of terpenes separated from the essential oil of a citrus fruit other than mandarin, said ingredients being in a relative proportion so as to impart a mandarin-like flavor and aroma to foodstuffs and beverages.
6. The method of producing a flavoring composition which comprises forming an admixture consisting essentially of synthetic flavor ingredients thymol and methyl N-methyl-anthranilate along with a diluent, said diluent consisting of orange terpenes as obtained by separation from the essential oil of orange, said ingredients being in a relative proportion so as to impart a mandarin-like flavor and aroma to foodstuffs and beverages.
7. The method of producing a flavored foodstuff which comprises incorporating in said foodstuff a synthetic flavoring composition, said synthetic flavoring composition being prepared by forming an admixture consisting essentially of thymol and methyl N-methyl-anthranilate in a relative proportion so as to impart a mandarin-like flavor and aroma to the foodstuff.
8. The method of producing a flavored beverage which comprises incorporating in said beverage a synthetic flavoring composition, said synthetic flavoring composition being prepared by forming an admixture consisting essentially of thymol and methyl N-methyl-anthranilate in a relative proportion so as to impart a mandarin-like flavor and aroma to the beverage.

References Cited

"Helvetia Chimica Acta": vol. XLVI, Fasciculus V, 1963, Switzerland.

A. LOUIS MONACELL, *Primary Examiner.*

H. H. KLARE, *Assistant Examiner.*